United States Patent [19]

Rojey et al.

[11] 4,433,554
[45] Feb. 28, 1984

[54] PROCESS FOR PRODUCING COLD AND/OR HEAT BY USE OF AN ABSORPTION CYCLE WITH CARBON DIOXIDE AS WORKING FLUID

[75] Inventors: Alexandre Rojey, Garches; Jacques Cheron, Laffite, both of France

[73] Assignee: Institut Francais du Petrole, Rueil-Malmaison, France

[21] Appl. No.: 399,158

[22] Filed: Jul. 16, 1982

[51] Int. Cl.³ .............................................. F25B 15/00
[52] U.S. Cl. .................................................... 62/112
[58] Field of Search ......................... 62/101, 112, 476; 252/67

[56] References Cited

U.S. PATENT DOCUMENTS 3,968,045  7/1976  Sibley ...................... 62/112

*Primary Examiner*—Lloyd L. King
*Attorney, Agent, or Firm*—Millen & White

[57] ABSTRACT

Process for producing cold and/or heat, making use of an absorption cycle and wherein carbon dioxide is the working fluid, comprising the steps of:

(a) heating a solution $L_1$ of carbon dioxide in a liquid solvent so as to obtain a carbon dioxide gaseous phase $G_1$ and a desorbed liquid phase $S_1$, (b) dissolving said gaseous phase in a liquid solvent $S_2$ therefor while removing the evolved heat, (c) heating under reduced pressure the solution obtained in step b so as to desorb a carbon dioxide phase $G_2$ therefrom and form a desorbed liquid phase $S_3$, (d) admixing $S_1$ and $G_2$ at the pressure level of $G_2$ while removing heat and increasing the pressure of the resulting solution $L_3$ to the pressure of $L_1$ and recycling it at least partially to step a, and (e) recycling at least a portion of $S_3$ to step b after recompression to the pressure level of $G_1$, in order to reconstitute $S_2$.

9 Claims, 4 Drawing Figures

PROCESS FOR PRODUCING COLD AND/OR HEAT BY USE OF AN ABSORPTION CYCLE WITH CARBON DIOXIDE AS WORKING FLUID

The present invention relates to a new process for producing cold and/or heat by means of an absorption cycle, said cycle being based on the successive absorption and desorption of a gaseous phase formed, at least partly, of carbon dioxide.

The processes for producing cold and/or heat by means of absorption cycles generally make use either of a water-ammonia couple, or a water-lithium bromide couple. These two couples suffer from a certain number of drawbacks. The water-ammonia couple raises security problems in view of its toxicity and of the inflammability of ammonia. The water-lithium bromide couple also suffers from numerous disadvantages: liability of crystallization of lithium bromide, corrosion, very low operating pressures resulting in the possible penetration of air, impossibility to operate at low temperature to avoid freezing of water. Other fluids have been proposed, such, for example, as the couples formed of a halogenated fluid such as difluorochloromethane (R-22) and an organic solvent such as dimethyltetraethylene glycol (DMTEG), but these fluids give reduced performances and require high feedback rates of the solution; in addition, they raise problems of thermal stability.

Figure 1:
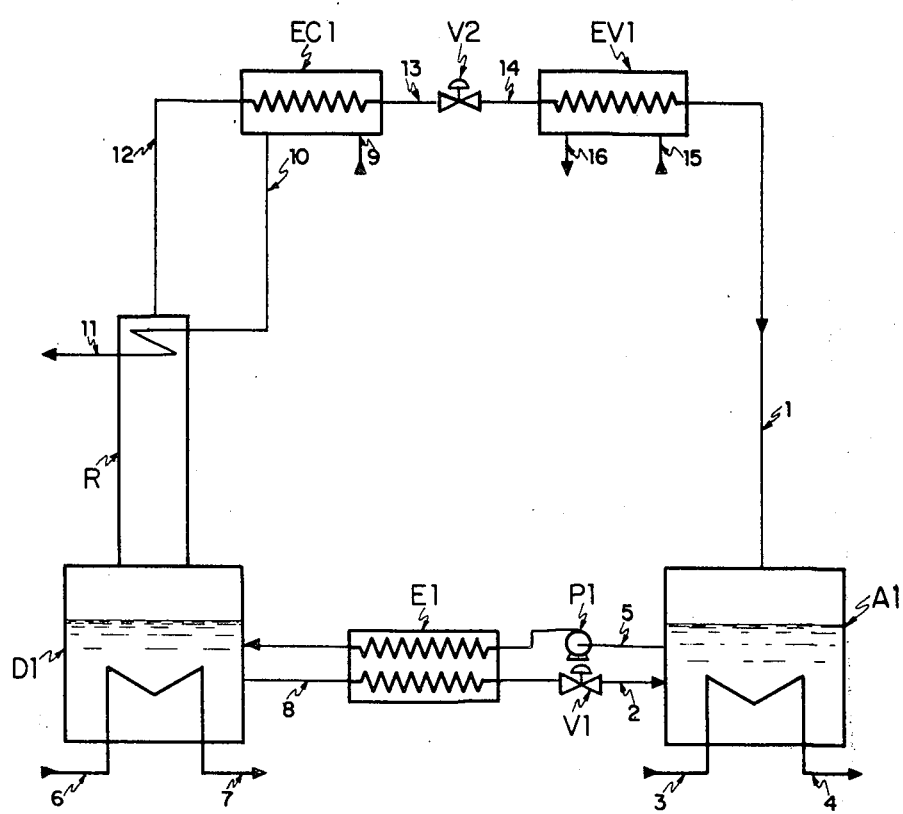
FIG. 1 shows a conventional operating diagram of an absorption cycle, as commonly used with the above described couples.

In the diagram of FIG. 1, illustrating the state of the art, the working fluid (F), supplied in gaseous phase through line 1, is absorbed by a solvent phase (S) fed, through line 2, to the absorption zone A1, the absorption heat being transferred to an external fluid supplied through line 3 and discharged through line 4. The so-formed solution is discharged through line 5 and supplied, by pump P1, to exchanger E1. At the output of the exchanger E1, this solution is fed to the desorption zone D1 wherein a vapor phase of high content of working fluid (F) is again generated, the desorption heat being supplied by an external fluid which is fed through line 6 and is discharged through line 7. The lean solution obtained is fed through line 8 to exchanger E1 and then expanded through the expansion valve V1 and supplied, through line 2, to the absorption zone A1. The obtained vapor phase is rectified in a rectification zone R to remove the stripped solvent from said vapor phase. In certain cases such as, for example, when using a water-lithium bromide couple, there is no stripped solvent and no need for a rectification zone. The rectification zone R is cooled at the top by an external fluid supplied through line 10 and discharged through line 11. The rectified vapor phase is discharged through line 12. It is then condensed in exchanger EC1 which is cooled down by an external fluid fed through line 9 and discharged through line 10. The obtained liquid phase is supplied, through line 13, to the expansion valve V2 wherefrom it is discharged through line 14. The so-obtained expanded liquid phase is vaporized in exchanger EV1 by taking heat from an external fluid fed through line 15 and discharged through line 16. The so-obtained vapor phase is recycled through line 1 to the absorption zone. In such a process it is possible, by the succession of absorption and desorption stages, to compress the vapor phase working fluid from a low pressure close to the pressure prevailing in evaporator EV1 up to a high pressure close to the pressure prevailing in condenser EC1.

The process according to the invention makes use of a carbon dioxide gaseous phase which is subjected to an absorption in a liquid solvent phase, followed with a desorption operated at higher pressure and higher temperature.

Carbon dioxide is a very common fluid and offers numerous advantages, particularly a low cost of manufacture and a high security of use. It is however practically impossible to use it in an absorption cycle such as that diagrammatically shown in FIGS. 1. As a matter of fact its critical temperature is 31° C. and its critical pressure is 73.8 bars. These properties are practically incompatible with the temperature levels required in the condenser of a heat pump or even of a refrigerating unit.

Figure 2:
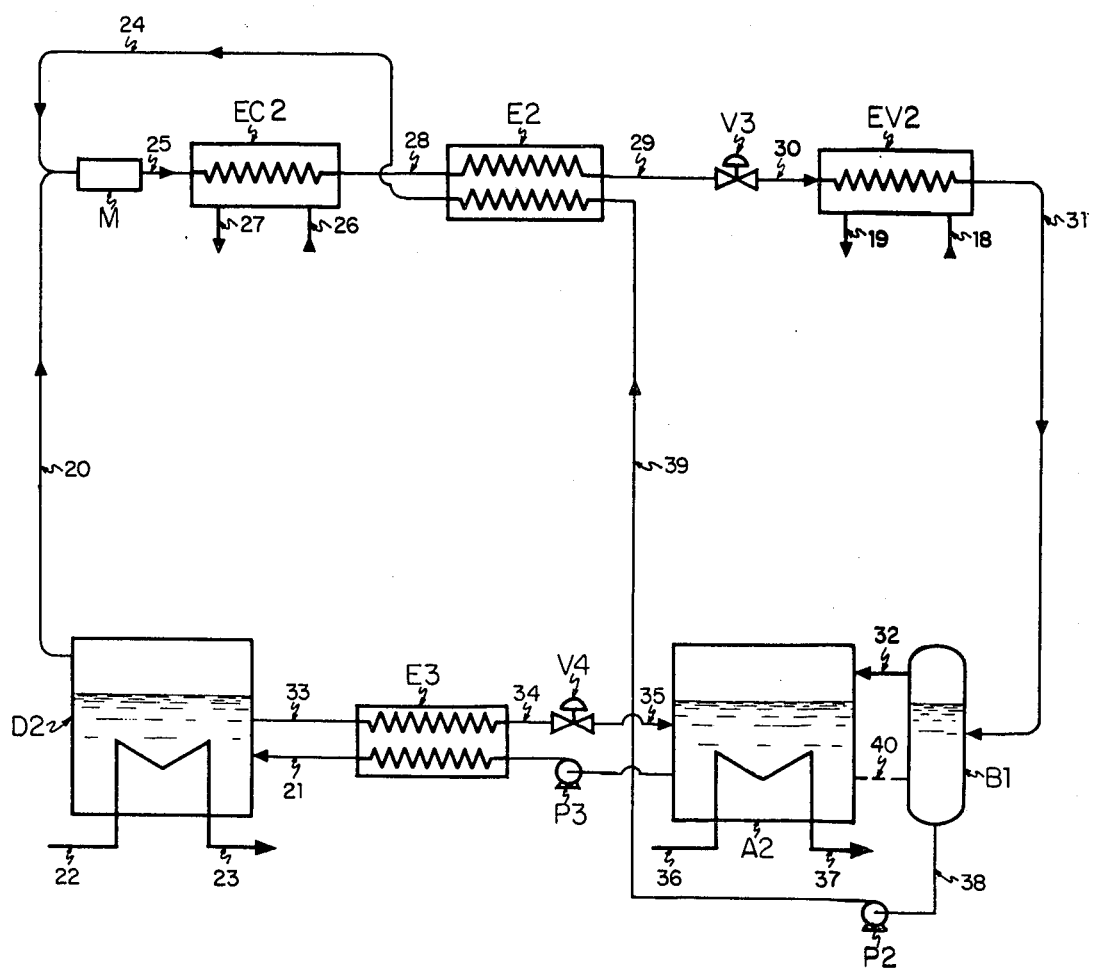
FIG. 2 shows a first embodiment of the invention.

It has been discovered, and this is the object of the present invention, that, in contrast with what can be assumed from the preceding observations, it is possible to advantageously make use of carbon dioxe, provided that the operation is conducted according to a cycle which is diagrammatically shown in FIG. 2.

The carbon dioxide solution discharged from absorber A2 is fed, through pump P3, exchanger E3 and line 21, to the desorption zone D2 wherein it is heated by an external fluid fed through line 22 and discharged through line 23. The obtained solution, of lower carbon dioxide content, is fed through line 33 to exchanger E3, wherefrom it is discharged through line 34, expanded through the expansion valve V4 and fed, through line 35, to the absorption zone A2. The obtained gaseous phase is discharged from the desorption zone D2 through line 20. It is then admixed with a solvent phase supplied through line 24, the so-obtained liquid-vapor mixture being advantageously fed to the admixing zone M to complete the homogenization and then, through line 25, to exchanger EC2. In exchanger EC2 carbon dioxide is absorbed in the solvent phase, the evolved heat being transmitted to an external fluid fed through line 26 and discharged through line 27. The so-obtained solution is supplied through line 28 to exchanger E2 wherefrom it is discharged through line 29. It is then expanded through the expansion valve V3 wherefrom it is discharged through line 30 to be fed to exchanger EV2. In exchanger EV2 a carbon dioxide gaseous phase is again generated, the required heat being taken from an external fluid fed through line 18 and discharged through line 19. The obtained liquid-gas mixture is supplied through line 31 to the settling vessel B1. In this settling vessel B1 the gaseous phase and the liquid phase are separated. The gaseous phase is fed through line 32 to the absorption zone A2 wherein it is absorbed by the solvent phase fed through line 35, the absorption heat being transferred to an external fluid supplied through line 36 and discharged through line 37. The liquid phase is withdrawn through line 38 by pump P2 and fed, through line 39, to exchanger E2, wherefrom it is discharged through line 24. The so-described cycle thus comprises two circulation circuits of solvent phase. Line 40 has for object to maintain substantially constant the solvent amounts contained in the two circuits and this is achieved, for example as indicated in the diagram of FIG. 2, by maintaining, through hydrostatic balance, the levels in A2 and B1 at the same height.

Thus, in case of operation as heat pump according to the above-mentioned diagram, heat at a high thermal level is supplied to generator D2 and heat at low thermal level (for example external air or water) to the desorber EV2. Useful heat at an intermediate thermal level is recovered in absorbers A2 and EC2.

When operating the device as refrigerating unit, the cold source consists of the evaporator EV2.

Finally, the process according to the invention is characterized in that:

(a)—a solution (L1) of carbon dioxide in a solvent liquid phase is subjected to heating under conditions of at least partial carbon dioxide desorption so as to form a gaseous phase (G1) of carbon dioxide and a desorbed liquid phase (S1), and the phase (G1) is separated from the phase (S1), (b)—the gaseous phase (G1) is admixed with a carbon dioxide solvent liquid phase (S2) and the evolved heat is removed, so as to dissolve at least a portion of the gaseous phase (G1) into the solvent liquid phase (S2) and to obtain a solution (L2) of carbon dioxide in the solvent liquid phase (S2), (c)—the pressure of the solution (L2) is decreased and this solution is subjected to heating under conditions of at least partial carbon dioxide desorption, so as to form a gaseous phase (G2) of carbon dioxide and a desorbed liquid phase (S3), the phase (G2) being separated from the phase (S3), (d)—the pressure of the desorbed liquid phase (S1) is decreased substantially to the pressure level of the phase (G2) and the phase (S1) is admixed with phase (G2), while removing the evolved heat, so as to obtain a solution (L3) of phase (G2) in phase (S1), (e)—the pressure level of the solution (L3) is increased substantially to the pressure level of solution (L1) and, then, at least a portion of solution (L3), after recompression, is fed back to stage (a) to reconstitute at least a portion of solution (L1), and (f)—the pressure level of the desorbed liquid phase (S3) is increased substantially to the pressure level of the gaseous phase (G1) and, then, at least a portion of the liquid phase (S3) is fed back, after recompression, to stage (b), so as to reconstitute at least a portion of the liquid phase (S2).

According to another preferred embodiment, used preferably in combination with the first one, the solution (L2) issued from stage (b), is subjected, before being fed to stage (c), to a heat exchange with the liquid phase (S3) or (S2).

According to another preferred embodiment, used preferably with the first one, the solution (L3) or (L1) is subjected to a heat exchange with the liquid phase (S1) discharged from stage (a).

Exchangers E2 and E3 are used to heat the liquid phases respectively supplied to condenser EC2 and to the desorption zone D2 by recovering heat from the liquid phases respectively discharged from condenser EC2 and from the desorption zone D2.

It may be advantageous to recover a portion of the heat supplied during the absorption stage to provide a portion of the heat required for the desorption stage. This can be achieved by proceeding according to the diagram shown in FIG. 3.

The gaseous phase obtained in the desorption zone D3 is discharged through line 44. It is admixed with a solvent phase fed through line 45. The liquid-vapor mixture is homogenized in the admixing zone or mixer M and then, discharged through line 47 to pass through exchanger EC5.

In this exchanger carbon dioxide is absorbed in the solvent phase while releasing heat which is transferred to an external fluid fed through line 48 and discharged through line 49. The solution is fed, through line 50, to exchanger E5 wherefrom it is discharged through line 51 after heat transfer to the liquid pumped by pump P4 and fed back to the mixer; it is then expanded through valve V5 and supplied, through line 52, to exchanger EV5. In exchanger EV5 gaseous carbon dioxide is separated from the solution, an external fluid, fed through line 54 and discharged through line 55, supplying the heat required for the desorption. The so-generated liquid-gas mixture is supplied through line 53 to the settling zone B2 where the two phases are separated. The liquid phase is withdrawn through line 54a and pump P4 to be introduced into exchanger E5 wherefrom it is discharged through line 45.

The gaseous phase discharged from the settling vessel B2 is conveyed through line 56 to line 58 where it is admixed with the liquid phase of low solute content supplied through line 57 and expansion valve V6 from the desorption zone D3.

The mixture of the two gaseous and liquid phases is fed to exchanger E4, where a portion of the gaseous phase is absorbed by the liquid phase, is discharged through line 59 and reaches the absorption zone A3 where substantially all the gaseous phase is absorbed by the solvent.

The liquid phase discharged from the absorber A3 through line 60 is pumped by pump P5 and fed to E4.

In exchanger E4 the heat supplied by absorption of the gaseous phase in the liquid phase of low solute content is transferred to the solution discharged from P5 and generates a portion of the carbon dioxide gaseous phase. This gaseous fraction and the residual liquid are supplied to desorber D3 through line 41.

The line 61 between the settling zone B2 and the absorption zone A3 has the same purpose of maintaining the amount of solvent contained in both circuits.

When again referring to FIG. 2, it may be also advantageous, in order to reduce the pressure prevailing in exchanger EC2, to continue the carbon dioxide absorption in the solvent phase during the exchange effected in exchanger E2, the evolved heat being transferred to the solution which is heated during the exchange effected in exchanger E2 while producing an evolution of gaseous carbon dioxide. Such an arrangement can be achieved by operating according to the diagram shown in FIG. 4.

The gaseous phase, of high carbon dioxide content, generated in the desorption zone D4, is fed through line 62 to the admixing zone M where it is contacted with the liquid phase of low carbon dioxide content fed through line 63.

The mixture discharged from the admixing zone M through line 64, is fed to exchanger EC6 where occurs a partial absorption of the carbon dioxide gaseous phase in the solvent solution, the heat generated by this absorption being transferred to an external fluid fed through line 65 and discharged through line 66.

The mixture discharged from exchanger EC6 through line 67 continues to be subjected, in exchanger E6, to the absorption of the gaseous phase in the solvent, thus transferring heat to the liquid phase supplied, through line 68, from the settling vessel B3.

Through line 70, a liquid phase of high solute content, which is expanded through valve V7, is discharged from exchanger E6 and is introduced, through line 71, into exchanger EV6. Heat supplied by an external fluid fed through line 72 and discharged through line 73 provides for the partial desorption of a gaseous phase of high carbon dioxide content, discharged with the liquid phase, through line 74, to the settling vessel B3.

The liquid phase, discharged from this settling vessel B3, is conveyed through line 68 to exchanger E6 where it is heated so as to generate a gaseous phase of high carbon dioxide content, discharged, with the liquid phase, through line 69 to the settling vessel B4.

From this settling vessel B4, the liquid phase of low solute content is withdrawn through line 76 and then introduced by means of pump P6 and line 63 into the admixing zone M.

The gaseous phase, of high carbon dioxide content, discharged from B4 through line 77, as well as the gaseous phase discharged from B3 through line 75, are admixed in line 78 with the liquid phase discharged from the desorption zone D4 through line 79 and the expansion valve V8.

The gaseous and liquid phases from line 78, transfer, in exchanger E7, heat generated by the exothermicity of the absorption of the gaseous phase in the liquid phase. A gas and liquid mixture is discharged from exchanger E7 and conveyed, through line 80, to the absorption zone A4 where the absorption is continued, while transferring heat to an external fluid fed through line 81 and discharged through line 82.

The liquid phase, of high solute content, discharged from the absorption zone A4 through line 83, is introduced, by means of pump P7 and line 84, into exchanger E7.

A portion of the carbon dioxide contained in said liquid phase is vaporized in exchanger E7 by the above-described heat supply generated by the partial absorption of the vapor phase in the liquid phase supplied from line 78.

The gas and liquid mixture discharged from exchanger E7 is transferred through line 85 to the desorption zone D4 where the desorption is continued by heat supply from an external fluid fed through line 86 and discharged through line 87.

The solvents used in absorbers (A2) and (EC2) may be of the same kind or different. Any liquid capable to dissolve carbon dioxide in a reversible manner (i.e. capable to release carbon dioxide by subsequent heating of the solution) may be used, irrespective of the absorption type, physical or chemical.

Subject to the condition of reversibility, the solvents may be selected from any chemical family and, for example, from the amines, amides, ketones, carboxylic esters, alcohols, glycols, est-ers, nitriles, sulfones, sulfoxides or phosphoric esters.

A preferred family is that of amines, particularly that of alkylamines, arylamines, cyclic amines and alkanolamines, used preferably in aqueous solution. Examples are aqueous solutions of monoethanolamine, diethanolamine, triethanolamine, diisopropanolamine, methyldiethanolamine or (2 amino-ethyl) (2 hydroxy-ethyl) ether, known in the trade as Diglycolamine (DGA), isopropylamine, diethylenetriamine, morpholine or ethylene-diamine.

Other examples of solvents are dimethylsulfoxide, diethyleneglycol, N-methyl pyrrolidone, tri-n-butyl phosphate, sulfolane, propylene carbonate, glycerol triacetate, methoxy diethylene glycol acetate, polyethylene glycol dimethylether, methanol, methyl cyanoacetate, glutaronitrile, dimethylformamide, and the methyl isopropyl ethers of oligoethyleneglycol.

It is also possible to use a mixture of amine with a solvent of another of the above-mentioned families, with or without water, e.g. a mixture of ethylene glycol with water and diethanolamine.

The invention is illustrated by examples 1 and 2.

EXAMPLE 1

Figure 3:
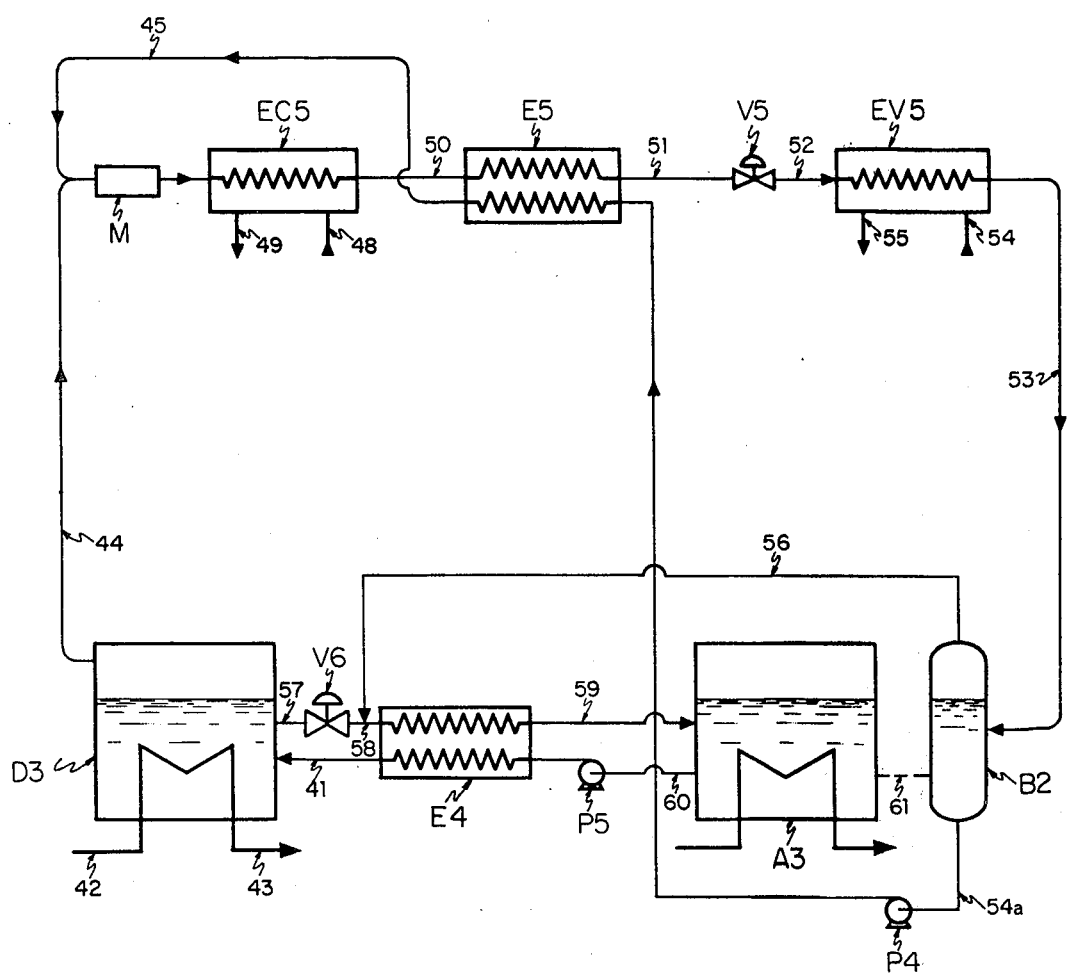
FIGS. 3 and 4 show two other embodiments of the invention.

Example 1 is described with reference to the diagram of FIG. 3. In this example the fluid is carbon dioxide, the solvent an aqueous solution containing 60% by weight of (2-amino ethyl) (2-hydroxy ethyl) ether (DGA), known in the trade as diglycolamine (trade mark).

394 l/h of an aqueous solution of carbon dioxide in the above mentioned solvent with a molar ratio (number of $CO_2$ moles dissolved per mole of DGA) of 0.33, together with 382 moles/h of carbon dioxide, are fed, through line 41, to the desorption zone.

The whole is heated by means of an external fluid up to 180° C. with a power of 10 kW. The resultant gaseous phase, amounting to 675 moles/h of carbon dioxide, is discharged through line 44. The liquid phase is fed back to the expansion valve V6. After admixture with carbon dioxide, the liquid phase is supplied to exchanger E4 where it transfer heat resulting from its high temperature and from the partial absorption of carbon dioxide. The absorption continues in zone A3 between 75° C. and 53° C. corresponding to the temperature of the liquid discharged through line 60. An external fluid recovers the heat evolved in the absorption zone A3. A pump P5 is used to return the DGA aqueous solution, whose molar $CO_2$ content is only 0.2 and which is caused to pass through exchanger E4 where it is partially desorbed, the temperature being brought to about 170° C.

The gaseous phase generated at 180° C. in the desorption zone D3 is admixed with a DGA aqueous phase containing carbon dioxide in a molar proportion of about 0.64, the temperature of said aqueous phase being 35° C.

In exchanger EC5 carbon dioxide is again absorbed by said liquid phase whose temperature increases and which transfers heat to an external fluid. The liquid phase, whose carbon dioxide molar content is 0.77, is discharged at 40° C. at a rate of 909 l/h; it is supplied to exchanger E5 where it releases the heat corresponding to a temperature decrease from 40° C. to 5° C.; it is then expanded through valve V5 from a pressure of 30 bars to a pressure of 1.2 bar (absolute).

An external fluid avoids, by a heat supply of 5.15 kW, a too substantial temperature decrease of the DGA solution.

Discharged at 0° C., a gaseous phase and a liquid phase whose $CO_2$ molar ratio is decreased to 0.64, are separated in the settling vessel B2.

The gaseous phase is introduced into line 58 where circulates the amine of low carbon dioxide content.

The liquid phase is discharged from the settling vessel B2 and reintroduced, through pump P4, into exchanger E5 where it is heated from 0° C. to 35° C. before being introduced into the admixing zone M.

In this example and with a desorption and dissolution heat amounting to 78 kJ/mole of carbon dioxide for lean solutions and to 50 kJ/mole of carbon dioxide for rich solutions, it has been found that the thermal power taken from the external fluid amounts to 5.15 kW when the thermal supply is 10 kW. The performance coefficient of the system operating according to this example as heat pump is 1.51.

EXAMPLE 2

Figure 4:
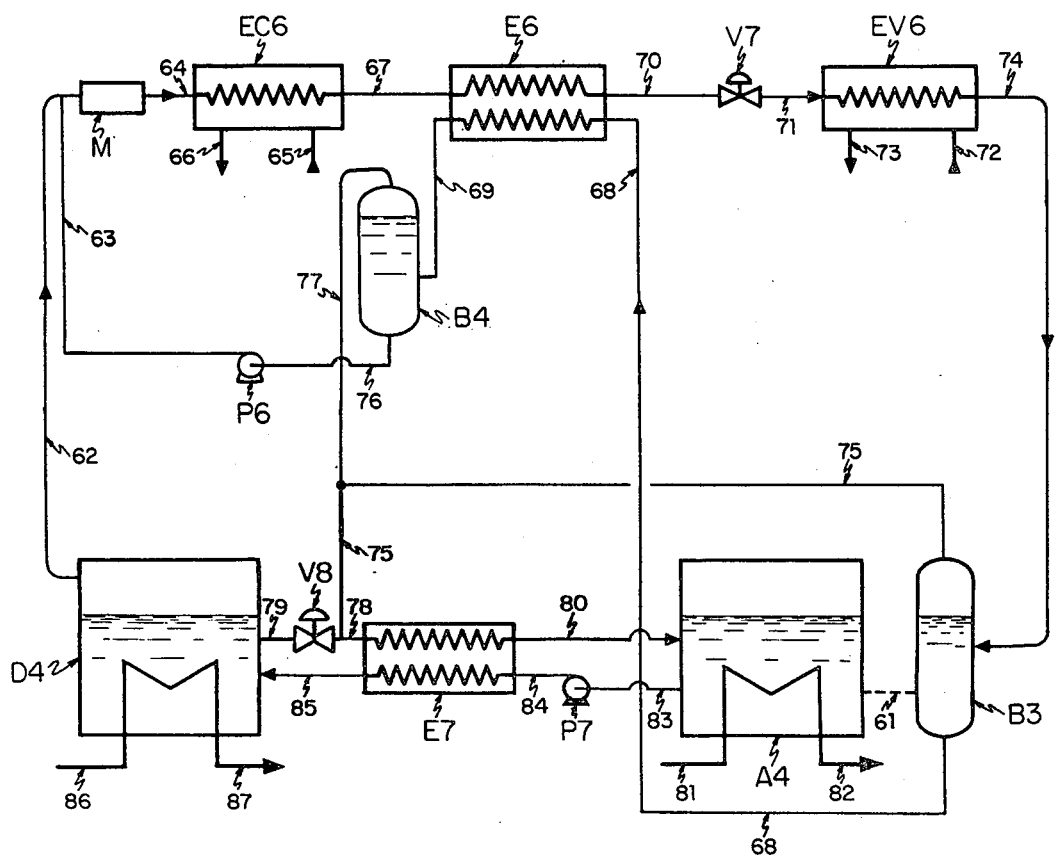

Example 2 is given with reference to the diagram of FIG. 4. In this example the working fluid is carbon dioxide and the solvent a (8N) concentrated aqueous solution of diethanolamine (DEA).

At a temperature near 150° C., the desorption zone D4 is fed, through line 85, with a liquid phase consisting of an aqueous solution of diethanolamine (flow rate of 383 l/h) whose carbon dioxide content as measured by the $CO_2$ molar ratio, is 0.15 (number of $CO_2$ moles in relation with the number of DEA moles) and with a gaseous phase consisting essentially of carbon dioxide (flow rate of 1072 moles/h).

An external fluid supplies heat (10 kW) to the phases mixture by bringing its temperature to 160° C. It results an increased desorption of the liquid phase whose $CO_2$ molar ratio at said temperature (at the selected working pressure of 20 bars) is decreased to 0.06.

Once discharged and expanded to 2 bars through valve V8, the liquid is admixed in line 78 with a certain amount of carbon dioxide which will be partially absorbed by the liquid in exchanger E7 with a temperature decrease of the liquid from 160° C. to 65° C.

The absorption terminates in the absorption vessel A4 by transferring heat down to a temperature of 55° C. to an external fluid.

The liquid phase, thus cooled to 55° C., increases its carbon dioxide content up to a molar ratio of 0.5.

The pump P7 provides for the return of the liquid phase to exchanger E7, where the liquid phase, receiving the heat evolved as a result of the already described partial adsorption, is heated up to 150° C. and releases a portion of the carbon dioxide contained therein. Accordingly the previously described phase mixture is found again at the input of the desorption zone.

It is found that the heat supply of 10 kW is associated with a carbon dioxide evolution at a rate of 1348 moles/h at 160° C. and under an absolute pressure of 20 bars.

The gaseous phase discharged from D4 is again absorbed, after passage through the admixing zone M, by an aqueous solution of DEA, supplied at 20 bars through line 63, at a temperature of 35° C., a molar ratio of 0.575 and a flow rate of 661 l/h. In these conditions the carbon dioxide is partially absorbed while transferring heat to an external fluid in exchanger EC6. By limiting the temperature to 40° C. at the output of said exchanger, the absorption is continued in exchanger E6 where the output temperature is 5° C.

After expansion through valve V7, the liquid again desorbs the gaseous phase as heat is supplied thereto from an external fluid at a low thermal level, the output temperature being limited to 0° C.

After settling in vessel B3, the liquid phase of molar ratio 0.675 is again introduced into exchanger E6 where, through the heat supplied therein up to 35° C., a fraction of the carbon dioxide is again desorbed. The resulting mixture is settled in the vessel B4. The liquid, whose molar ratio is 0.575, is reintroduced through pump P6 into the admixing zone M.

The carbon dioxide gaseous phases recovered from the settling vessels B3 and B4 are reintroduced into the solution discharged, after expansion through V8, from the hot desorption zone D4.

With the flow rate, pressure and temperature values of said example 2 and with dissolution or desorption heats of 90 or 50 kJ/mole of $CO_2$, according to the richness of the solution, it is found that, at the level of exchanger EV6, 8.7 thermal kW are supplied by the external fluid.

Accordingly, the performance coefficient for such a system, operating as heat pump, amounts to 1.87.

An alternative embodiment of the diagram of FIG. 4 consists of locating the valve V8 on line 80, between exchanger E7 and absorber A4; in this case the gaseous phases discharged from lines 77 and/or 75 are admixed with the liquid of line 80, after expansion, instead of being fed to line 78.

The operating conditions used in these examples must not be considered as limitative.

Different embodiments in the arrangement may be considered without changing the principle of the process according to the invention.

The process may be operated at very different power scales, for example, as concerns the power measured at the colder point (low temperature), of a few hundreds of watts to a few megawatts.

Various equipments may be used to operate the process.

The exchangers may be, for example, shell-and-tube exchangers or plate exchangers.

The absorption and desorption steps are preferably conducted in columns of the same type as those frequently used in chemical engineering for these kinds of operations, comprising plates or packings.

In a heat pump installation it may be advantageous to serially connect lines 36, 37, 26 and 27 and circulate therethrough the fluid to be heated.

The evaporation temperature of the working fluid (carbon dioxide) may be for example in the working range from −60° C. to +130° C.

The adsorption temperatures may be for example in the temperature range from +10° C. to +120° C. The heating temperature of the generator of the desorption zone may be, for example, in the temperature range from +100° C. to +250° C.

It is clear that the selected temperatures depend on the selected solvent and on the temperature levels at which it is desired to supply and receive heat.

Different operating conditions may be obtained by varying the concentrations of carbon dioxide in the solvent phase.

In particular when the carbon dioxide concentration is lower in solution L2 than in solution L1, the system operates as thermal converter, i.e. it supplies heat during step (b) at a higher thermal level than the heat taken during step (a). It thus makes possible to convert a portion of the heat at intermediate thermal level, taken during steps (a) and (c), to heat at a higher thermal level during step (b), the remaining heat, generated during step (d), being transferred at low thermal level.

The maximum operating pressure of the device is generally lower than 50 bars. However it must be observed that the desorption (a) and absorption (b) steps are conducted at identical or very similar pressure levels, higher than those of the desorption (c) and absorption (d) steps which are conducted substantially at the same pressure level.

It is not necessary that carbon dioxide be pure; it is even possible to make use of mixed fluids having carbon dioxide as one of their components, particularly when the other components can themselves dissolve in the selected solvent and can be released therefrom under the same conditions as those applicable to carbon dioxide.

What is claimed is:

1. A process for producing cold and/or heat, making use of an absorption cycle, characterized by the steps of:
    (a) subjecting a solution (L1) of carbon dioxide in a liquid phase comprising a solvent for carbon dioxide to heating, under at least partial carbon dioxide desorption conditions, so as to form a gaseous phase (G1) of carbon dioxide and a desorbed liquid phase (S1), and separating the phase (G1) from the phase (S1),
    (b) admixing the gaseous phase (G1) with a liquid phase (S2) comprising a solvent for carbon dioxide and removing the heat evolved, so as to dissolve at least a portion of the gaseous phase (G1) into the solvent liquid phase (S2) and to obtain a solution (L2) of carbon dioxide in the solvent liquid phase (S2),
    (c) decreasing the pressure of solution (L2) and subjecting said solution to heating, under conditions of at least partial desorption of carbon dioxide, so as to form a gaseous phase (G2) of carbon dioxide and a desorbed liquid phase (S3), and separating the phase (G2) from the phase (S3),
    (d) decreasing the pressure of the desorbed liquid phase (S1) substantially to the pressure level of phase (G2) and admixing the phase (S1) with the phase (G2) while removing the evolved heat, so as to obtain a solution (L3) of the phase (G2) in the phase (S1),
    (e) increasing the pressure level of solution (L3) substantially to the pressure level of solution (L1) and then feeding back at least a portion of solution (L3), after recompression, to step (a) so as to reconstitute at least a portion of solution (L1), and
    (f) increasing the pressure level of the desorbed liquid phase (S3) substantially to the pressure level of the gaseous phase (G1) and then feeding back at least a portion of the liquid phase (S3), after recompression, to step (b) so as to reconstitute at least a portion of the liquid phase (S2).

2. A process according to claim 1, wherein the solution (L2) produced in step (b), before proceeding to step (c), is subjected to a heat exchange with the liquid phase (S3) or (S2).

3. A process according to claim 1, wherein the solution (L3) or (L1) is subjected to a heat exchange with the liquid phase (S1) discharged from step (a).

4. A process according to claim 1, wherein the solvent of carbon dioxide is the same in step (a) and in step (b).

5. A process according to claim 1, wherein the solution (L3) of step (d) directly communicates with the desorbed liquid phase (S3) of step (c) so as to maintain substantially constant the levels of the solution (S3) and of the liquid phase (S3).

6. A process according to claim 3, wherein the heat exchange of solution (L3) or (L1) with the liquid phase (S1) is effected after the latter has been subjected to a pressure decrease in step (d) and has been admixed with at least a portion of the gaseous phase (G2).

7. A process according to claim 1, wherein the solution (L2) is subjected, before being transferred to step (c), to a heat exchange with the liquid phase (S3), said exchange being effected before subjecting the liquid phase (S3) to a pressure increase in step (f), said heat exchange resulting in the formation of a gaseous phase (G3) of carbon dioxide from the liquid phase (S3), and wherein said gaseous phase (G3) is separated from the residual liquid phase (S3), the so-separated gaseous phase (G3) is admixed with the liquid phase (S1) previously subjected to the pressure decrease in step (d) and the residual liquid phase (S3) is then subjected to a pressure increase in step (f).

8. A process according to claim 7, wherein the product obtained by admixing the separated gaseous phase (G3) with the liquid phase (S1) is subjected thereafter to the heat exchange with the solution (L3) or (L1).

9. A process according to claim 8, wherein at least a portion of the gaseous phase (G2) is admixed with the gaseous phase (G3) before said heat exchange.

* * * * *